(12) United States Patent
Yin

(10) Patent No.: US 7,885,655 B2
(45) Date of Patent: Feb. 8, 2011

(54) SWITCH METHOD FOR ENSURING COMMUNICATION CONTINUITY IN MOBILE COMMUNICATION SYSTEM

(75) Inventor: Fang Yin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 920 days.

(21) Appl. No.: 11/542,967

(22) Filed: Oct. 4, 2006

(65) Prior Publication Data

US 2008/0219183 A1 Sep. 11, 2008

Related U.S. Application Data

(63) Continuation of application No. PCT/CN2005/002063, filed on Nov. 30, 2005.

(30) Foreign Application Priority Data

Dec. 2, 2004 (CN) ......................... 2004 1 0101020
Aug. 11, 2005 (CN) ......................... 2005 1 0036558

(51) Int. Cl.
*H04W 36/00* (2009.01)
(52) U.S. Cl. ...................... 455/436; 455/442; 455/437; 455/438; 455/439; 370/331
(58) Field of Classification Search ......... 455/436–439, 455/442; 370/331, 401
See application file for complete search history.

(56) References Cited

U.S. PATENT DOCUMENTS

| 5,664,007 | A | 9/1997 | Samadi et al. | |
|---|---|---|---|---|
| 6,889,045 | B2 | 5/2005 | Pan et al. | |
| 2002/0025816 | A1* | 2/2002 | Johansson et al. | 455/436 |
| 2002/0048266 | A1* | 4/2002 | Choi et al. | 370/331 |
| 2003/0086515 | A1* | 5/2003 | Trans et al. | 375/346 |
| 2004/0192294 | A1 | 9/2004 | Pan et al. | |

(Continued)

FOREIGN PATENT DOCUMENTS

CN 1348669 A 5/2002

(Continued)

OTHER PUBLICATIONS

3$^{rd}$ Generation Partnership Project: 1-27 (Nov. 1, 2002) http://www.3gpp2.org/Public_html/specs/N.S0031v1.0_LMSD_Step1.pdf.

(Continued)

*Primary Examiner*—Wayne Cai
(74) *Attorney, Agent, or Firm*—Leydig, Voit & Mayer, Ltd.

(57) ABSTRACT

The present invention discloses a switch method ensuring communication continuity, mainly including: when a switch occurs to an Mobile Station (MS), the MSC Server controlling the MGW establishing in a context a new termination connected with a new ground circuit; after the MS switching to a new wireless channel, the MGW controlling the new termination inheriting a resource channel from an original termination connected with an original ground circuit and continuing with the communications through the resource channel. The method of the present invention solves the problem of interruption in an announcement service, a data service and a QNC service caused by a switch process and the communication continuity during a switch procedure is ensured.

6 Claims, 4 Drawing Sheets

U.S. PATENT DOCUMENTS

2004/0235477 A1* 11/2004 Picha et al. ............ 455/439
2006/0084440 A1 4/2006 Bakri

FOREIGN PATENT DOCUMENTS

| CN | 1402949 A | 12/2003 |
|---|---|---|
| EP | 1076467 A | 2/2001 |
| KR | 20020091880 A | 11/2002 |
| WO | WO 01/39525 A2 | 5/2001 |
| WO | WO 2004/004373 A1 | 1/2004 |
| WO | WO 2004/036947 A1 | 4/2004 |

OTHER PUBLICATIONS

3RD Generation Partnership Project, "Technical Specification Group Core Network; Bearer-independent circuit-switched core network; Stage 2 (Release 4)," 3GPP TS 23.205 V4.7.0 (Jun. 2003).

3RD Generation Partnership Project, "Technical Specification Group Core Network; Media Gateway Controller (MGC)—Media Gateway (MGW) interface; Stage 3 (Release 4)," 3GPP TS 29.232 V4.8.0 (Jun. 2003).

International Telecommunications Union, "Series H: Audiovisual and multimedia systems, Infrastructure of audiovisual services—Communication procedures—Gateway control protocol," ITU-T Recommendation H.248 (Jun. 2000).

State Intellectual Property Office of the People'S Republic of China, Written Opinion of the International Searching Authority in the International Patent Application No. PCT/CN2005/002063 (Mar. 23, 2006).

State Intellectual Property Office of the People'S Republic of China, Office Action of Chinese Patent Application No. 2004101010204 (Sep. 29, 2006).

\* cited by examiner

SWITCH METHOD FOR ENSURING COMMUNICATION CONTINUITY IN MOBILE COMMUNICATION SYSTEM

This application is a continuation of International Patent Application No. PCT/CN2005/002063, filed Nov. 30, 2005, which claims priority to Chinese Patent Application No. 200410101020.4, filed Dec. 2, 2004, and Chinese Patent Application No. 200510036558.6, filed Aug. 11, 2005, all of which are hereby incorporated by reference.

FIELD OF THE TECHNOLOGY

The present invention relates to mobile communication technologies, and more particularly, to a switch method for ensuring communication continuity in $3^{rd}$ Generation (3G) mobile communication systems and in $2^{nd}$ Generation (2G) mobile communication systems by using a decomposed gateway architecture.

BACKGROUND OF THE INVENTION

With a rapid growth of communication technologies, the demand for personal communication has increased greatly. Mobile communication operators need to pay a special attention to all the aspects directly influencing the mobile service effects, such as user interface, quality of service (QoS) and so on. The characteristics of a 3G mobile communication system, such as a broad bandwidth, multiple services and a high quality, have already been attracting the market of the mobile communication. However there are still some problems existing in the 3G technologies. If these problems can not be solved effectively, the enlargement of 3G market will be constrained in a certain extent, and the development of the mobile operation business will also be affected.

Wideband Code Division Multiple Access (WCDMA) mobile communication system of the 3G technologies is composed of a Core Net (CN), a Universal Mobile Telecommunications System/Universal Mobile Telecommunication System/Universal Mobile Telecommunication Services (UMTS) Terrestrial Radio Access Network (UTRAN) and a User Equipment (UE). In the network architectures after WCDMA R4, the CN is not limited to a circuit switching mode. Instead, the packet switching mode, such as Asynchronous Transfer Mode (ATM), and Internet Protocol (IP), can be chosen as its bearer. The packet switching mode can not only improve the transmission speed of a network, enrich the service category of the network, but also facilitate the management and design of the network architecture. At the same time, in order to realize a separation of the call control and the bearer control, a Mobile Switching Center (MSC) can be divided into two parts: an MSC Server and a Media Gateway (MGW), wherein the MSC Server implements functions of calling control and mobility management while the MGW implements functions of bearer control and data transmission. The interface between the MSC Server and the MGW is called Mc interface, which adopts H.248 as its bearer control protocol.

In a Next Generation Network (NGN) configuration, Public Land Mobile Network (PLMN) including the above WCDMA mobile communication system also needs to carry out the function of interworking with other networks, such as Public Switch Telephone Network (PSTN) or Integrated Service Digital Network (ISDN), wherein the maintenance of a signaling interface between a 3G mobile network and other networks is implemented by the MSC, and the functions of data forwarding and resource channel establishment is implemented by the MGW.

SUMMARY OF THE INVENTION

The present invention provides a switch method for ensuring the communication continuity, including the steps of:

when a switch occurs to an MS, the MSC Server controlling the MGW establishing in a context a new termination connecting to a new ground circuit;

after the MS switching to a new wireless channel, the MGW controlling the new termination inheriting a resource channel of an original termination connecting to an original ground circuit and continuing the communications through the resource channel.

Comparing the present invention with the prior art, the main difference between the solution of the present invention and that in the prior art is that: in this invention, through an expanded Handover Package or changes of the network topology relationship between the terminations, the MCS Server can instruct the new terminal in the context to inherit the resource channel of the original termination after the switch of the MGW, making the new termination continue the communication in the same resource channel. As a result, the problem of interruption of voice announcement reproducing, data service transferring and QNC service caused by a switch procedure is solved and the communication continuity during a switch procedure is ensured. The method of the present invention can not only improve the friendly degree of a User Interface, the transmission efficiency and QoS, but also facilitate the enlargement of the service market of 3G.

DETAILED DESCRIPTION OF THE EMBODIMENTS

In order to make the object, technical solution and advantages of the present invention clearer, several preferred embodiments of the present invention will be described in detail hereinafter with reference to accompanying drawings.

Figure 1:
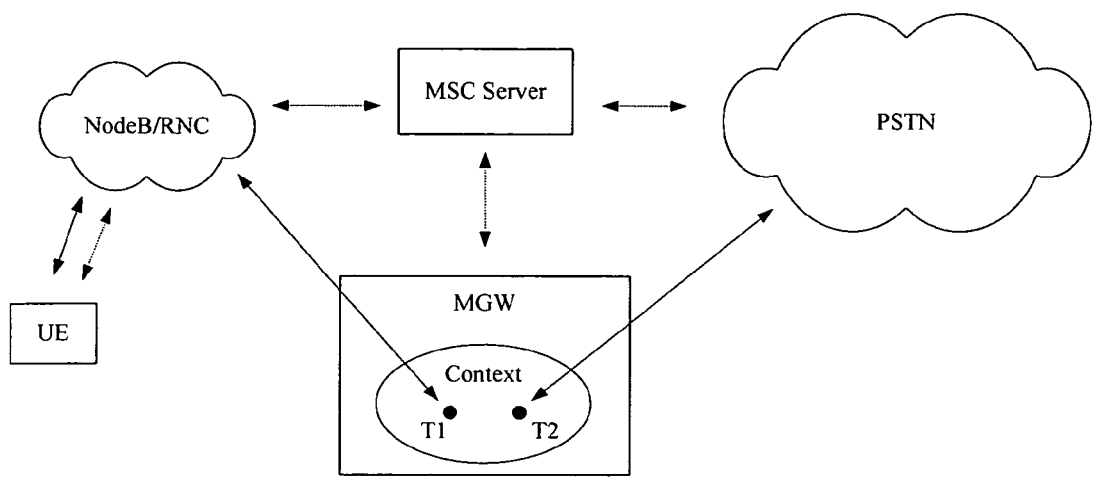
FIG. 1 is a schematic diagram illustrating a networking model and a calling procedure of a WCDMA system user calling a fixed network user.

FIG. 1 is a schematic diagram illustrating a networking model and a calling procedure for a WCDMA system user to call a fixed network user. The solid arrowhead denotes the transmission direction of user data while the dashed arrowhead denotes the transmission direction of signaling messages. The connecting procedure of this type of call includes:

After a UE completing its wireless access to the network, a Setup message is transmitted to a Node B/RNC to initiate a calling through the wireless channel, and the Setup message carries a called number.

The RNC forwards the Setup message to an MSC Server, the MSC Server analyzes the called number and finds it is an out-of-office call to the PSTN, and then the MSC Server transmits an Initial Address Message (IAM) to the PSTN; at the same time, the MSC Server transmits an ADD instruction of the H.248 protocol to the MGW, controlling the MGW adding two terminations named T1 and T2 into a context, wherein T1 corresponds to a ground circuit of the RNC and T2 corresponds to an inter-office relay circuit to the PSTN; and then the MSC Server transmits an assignment command to the RNC to complete the establishment of the wireless channel.

After receiving an Address Complete Message returned by the PSTN, the MSC Server transmits an Alerting message to the UE; and after receiving an Answer Message (ANM) of the PSTN, the MSC Server transmits a Connect message to the UE, and both sides enter a conversation state.

It can be seen that, during the connecting procedure between the UE and a PSTN user which is implemented under the signaling control of the MSC Server, the MSC Server carries out the interactive function between different signaling systems of the two sides and also establishes a connection channel while the MGW implements the function of physical bearer establishment.

Figure 2:
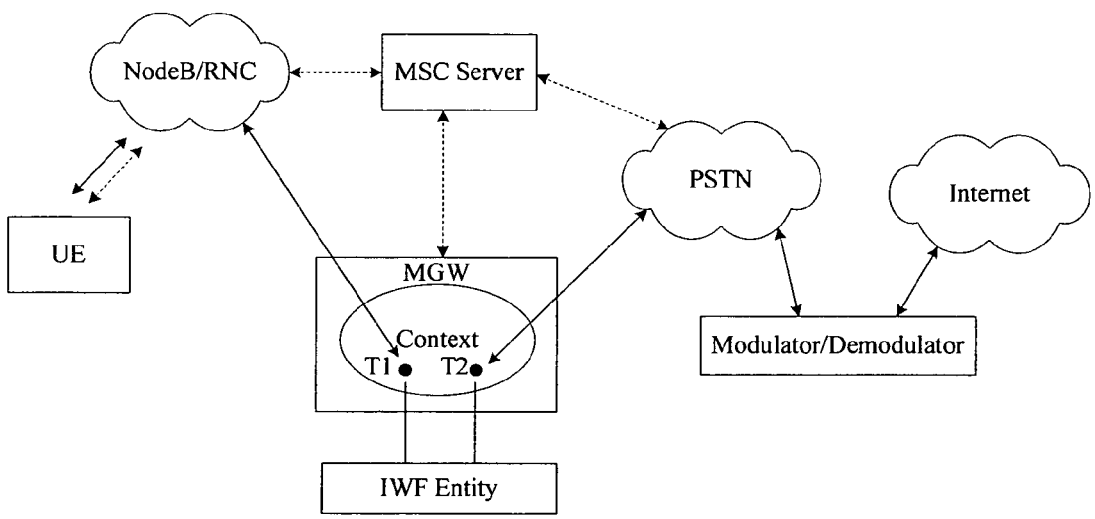
FIG. 2 is a schematic diagram illustrating a networking and a calling procedure of a WCDMA system user using a data service.

Actually, data services provided by the circuit switched domain of a WCDMA system further need the interposing of an Inter-Working Function (IWF) to implement speed adaptation and Modulation/Demodulation functions if a mobile user connects with other types of network, such as the PSTN or the ISDN, through the PLMN. FIG. 2 is a schematic diagram illustrating a networking model and a calling procedure for a WCDMA system user to call a fixed user for a data service. Likewise, the solid arrowhead denotes the transmission direction of user data, and the dashed arrowhead denotes the transmission direction of signaling messages. As shown in FIG. 2, under this kind of circumstance, in the ADD instruction transmitted from the MSC Server to the MGW, Bearer Capability (BC) parameters of the PLMN also need to be indicated to Termination T1 of the RNC side while BC parameters of the PSTN/ISDN need to be indicated to Termination T2 of the MGW side, according to which the MGW knows that the present call is a data call, and Termination T1 corresponds to the mobile side while Termination T2 corresponds to the fixed side. Then an IWF entity is interposed automatically, and the IWF entity is connects with Termination T1 and T2 respectively, so as to complete the establishment of the resource channel.

When an ANM is received from the PSTN side, the MSC Server transmits a MODIFY instruction of the H.248 protocol to the MGW, instructing the MGW to activate the interposed IWF. At this moment, on the mobile side, i.e. at the connection with T1, the IWF entity will implement Radio Link Protocol (RLP) synchronization, while on the fixed side, i.e. at the connection with T2, the IWF entity implements a routine Modulation/Demodulation negotiation. After the Modulation/Demodulation negotiation, data transmitting/receiving can be implemented between the mobile station (MS) and the fixed user.

During the above data call of common service, since the IWF entity needs to implement a Modulation/Demodulation negotiation between PLMN network and PSTN/ISDN network, the calling establishment time is relatively long, which is about 20-40 seconds, and has a severe impact on the customer experience using this service. In order to reduce the calling establishment time, a Quick Net Connect (QNC) data service is provided by the present cdma2000 mobile communication system. The QNC date service connects external data network directly through the IWF entity, leaving out the process of Modulation/Demodulation negotiation, so the calling establishment time will be greatly shortened, which is about 5-7 seconds. According to the evolution project of $3^{rd}$ Generation Partnership Project 2 (3GPP2), similar to a WCDMA network, a cdma2000 mobile communication system also adopts the idea of separating the call control from the bearer control, which results in dividing the original MSC into a Mobile Switching Center emulation (MSCe) and an MGW Media Resource Function Processor (MGW-MRFP). The function of the MSCe is similar to the MSC Server of a WCDMA system, which is used for realizing calling control for mobile UE while the function of the MGW-MRFP, MGW for short, is similar to the MGW of a WCDMA system and is used for implementing establishment, modification, release and resource management of a specific media stream.

Figure 3:
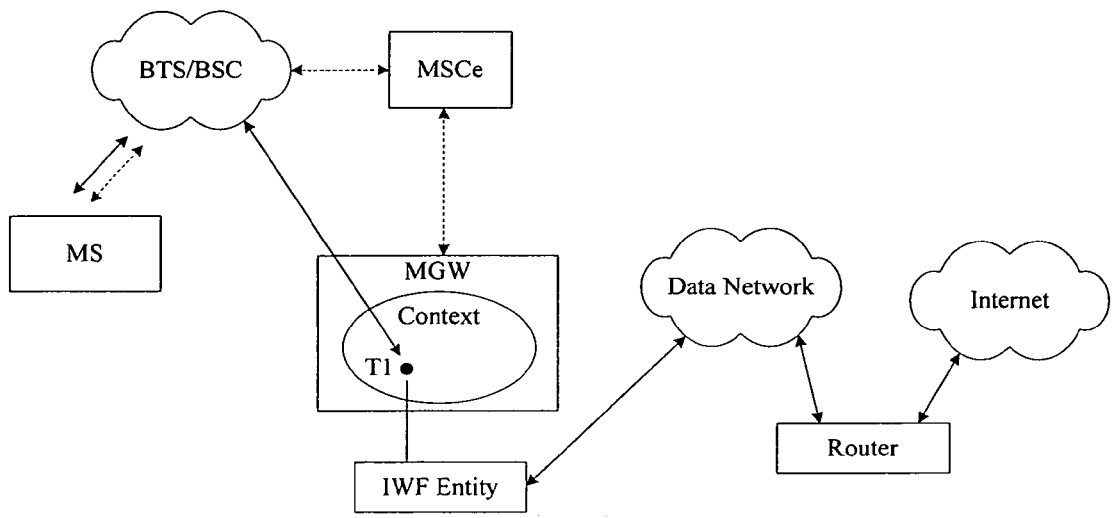
FIG. 3 is a schematic diagram illustrating a networking and a calling procedure of an MS calling a packet network through a data network and a router by means of QNC service.

The calling procedure of a QNC service is a little different from common services. FIG. 3 is a schematic diagram illustrating a networking model and a calling procedure of a QNC MS calling to a packet network through data network and a router. As shown in FIG. 3, the QNC service calling procedure is described as follows:

The MS transmits a Setup message to the Base Transceiver Station/Base Station Controller (BTS/BSC), and the Setup message carries a called number;

The BSC forwards the Setup message to the MSCe, and the MSCe analyzes the called number; after the called number is found a QNC access number, the MSCe sends an ADD instruction to the MGW to control the MGW adding an termination named T1 in a context, and Termination T1 is corresponding to the ground circuits accessing to the BSC; and further, it is needed to indicate BC parameters of PLMN to Termination T1;

The MGW learns that it is a data call according to the above information, and Termination T1 corresponds to the mobile side, so an IWF entity is interposed automatically, with one end of which connected to Termination T1 and the other end thereof connected to an external data network;

When the assignment for the mobile user is completed, the MSCe sends a MODIFY instruction to the MGW, instructing the MGW to activate the IWF entity. At this time, at the connection with Termination T1, the IWF entity implements RLP synchronization and a PPP negotiation;

After the above negotiation is completed, the MS can implement data transmitting/receiving operations.

The above QNC-service calling process is similar to a common data-service calling. The difference between them is that, during a QNC-service calling, Termination T2 which corresponds to a PSTN inter-office relay circuit does not exist, and no Modulation/Demodulation negotiation of the fixed side is needed. So the calling establishment time can be greatly reduced.

It can be seen from the above three calling procedures that, due to the mobility of MS, whether it is a voice/data call between a 3G mobile communication system and a fixed user or a QNC-service call, a problem caused by handing-over of MS among different cells always exists, i.e. when the MS enters one cell from another cell, or when the Base Station (BS) communicating with the MS, even the RNC/BSC, changes because of reasons in connection with radio signal quality, network bearer equalization and so on. The communication link of the mobile side needs to be reconfigured. For example, when the terminations in the context need to be reassigned, so do the corresponding resources, such as IWF entity, which will result in a disconnection of the current call. For instance, when a system is reproducing voice or transmitting data, the voice or data will be interrupted because of the switch procedure.

Next, take the WCDMA system as example to illustrate the above switch procedure:

As the first step of a switch procedure, according to the 3GPP protocol, when a switch of UE is carried out, the MSC Server will receive a switch request from the RNC side, then the MSC Server adds a new termination in the context of the MGW via an ADD instruction, which is named as T1' and connected to a new ground circuit;

When the UE switches to a new wireless channel, a new Node B/RNC will detect the access of the UE, and after receiving a report, the MSC Server will instruct the original RNC to release the corresponding calling resources and delete the original termination T1 in the MGW Context.

During the above switch procedure, if the MGW is playing a voice announcement to the user (i.e. there is a signal at Termination T1). Since the UE accesses through the ground circuit corresponding to Termination T1' after switching to the new wireless channel, the voice service provided at T1 cannot be transmitted to the user and the voice announcement for the user will stop suddenly. In the same way, when the MS is conducting a data communication, if there is a switch of the user, at the same time of introducing a new termination, a new IWF entity is introduced. Since the original IWF entity operates based on the negotiation of the original termination of the mobile side and the termination of the fixed side, the new termination and the fixed side must carry out new negotiations through the new IWF to continue the communication, which results in an interruption and disconnection of the communication. At the same time, the protocol negotiation introduced by the new IWF will bring about an extra delay, which will further reduce the QoS of the service greatly.

The present invention provides a switch method for ensuring communication continuity, of which the main idea is as follows: during a switch of an MS, information such as the time and object of the switch is provided for MGW directly or indirectly by an MSC Server or an MCSe (both are referred to in this invention as MSC Server in general) to control a new termination of the MGW inheriting the resource channel from an original termination, for example, inherit an announcement channel when the system reproduces voice announcement, or inherit an IWF channel during the communications of a data service or a QNC service, such that the new termination is enabled to continue with the communications in the original resource channel after the switch procedure and the continuity of the announcement service or date service and QNC service is ensured.

Specifically, the MSC Server can provide the MGW with the information about the time and object of a service switch in the following two ways:

(1) provide directly: the MSC Server sends parameters to the new termination with an expanded user-defined H.248 package, called a Handover Package, which enables the new termination to inherit the resource channel of the original termination during a switch procedure;

(2) provide indirectly: the MSC Server makes the MGW automatically transfer the resource channel of the original termination to the new termination during a switch procedure by appointing topology relationships of the new termination and the original termination with the termination corresponding to the opposite user or network, or by changing the topology relationships of the new termination and the original termination with the termination corresponding to the opposite user or network.

Hereinafter the switch method of this invention for ensuring communication continuity will be described in detail by preferred embodiments.

A First Embodiment

This embodiment carries out an announcement channel inheriting controlled by the MSC server by means of an expanded H.248 message, i.e. a user-defined Handover Package so as to ensure the voice announcement continuity during a switch procedure.

In this embodiment, when the MSC Server receives a switch request from the RNC/BSC at the side of the radio access network, it will immediately add a new termination T' in the context of the MGW via an ADD instruction, and connect the new termination T' to a new ground circuit so as to access a new RNC for communications after the switch procedure. At the same time, the MSC server needs to indicate information about the switch procedure with a Handover Package to the MGW. After receiving the Handover Package, the new termination T' can inherit an announcement channel from the original termination, according to the parameters carried in the Handover Package and the continuity of an announcement service is maintained.

The above Handover Package includes the following fields: Package Identification (Package ID), Version, Extends, Properties, Events, Signals denoting related signals for taking over various resource channels, and Statistics, wherein the Signals field is a key parameter field, which carries parameters needed by the new termination when it takes over an announcement channel from the original termination.

In this embodiment, values of each field in the Handover Package are set as follows: Package ID is defined as threegho (an abbreviation of 3G Hand Over), a hexadecimal value of which can be assigned by Internet Assigned Numbers Authority (IANA); Version is defined as 1; Extends is defined as NO; Properties is defined as NO; Events is defined as NO; Statistics is defined as NO; Signals is defined as Take over announcement channel, which further includes the following specific parameters:

Signal Identification (Signal ID) for identifying the signal, defined as tkann (0x0001), i.e. the abbreviation of Take over announcement channel; Signal Description for instructing the new termination T' to take corresponding actions, defined as "Capture an announcement channel from a designated termination"; Signal Type, defined as Brief; and Duration, defined as NO.

In addition, the parameters carried by the Signals field can also include the following additional parameters: Original Termination ID, for facilitating the new termination T' to find the owner of the resource channel it wants to inherit, i.e. the identification of the original termination T; Parameter ID, for indicating the characters of the additional parameters, defined as oriterm (0x001); Type, for indicating data types of the additional parameters, defined as Integer; Possible values, defined as any legal Termination ID except Root and Wildcard; and Parameter Description, indicating which termination's announcement-channel is to be taken over.

The above Type parameter is set as Integer because of the naming specifications of Termination ID in 3GPP. When binary code is used, Termination ID occupies 4 bytes. Therefore, the integer type is enough.

In addition, the above Original Termination ID can also be denoted in a text code, which can occupy 64 bytes according to the provisions of H.248 protocol. Under such circumstances, the Type parameter should be defined as Character String.

It can be seen that the above signal of Take over Announcement Channel defines the needed parameters when the new termination T' takes over an announcement channel from the original termination T, such as the ID and Description of the original termination T.

While the system is providing an announcement service, and if a switch procedure occurs, after receiving a switch request from the RNC side, the MSC Server sends an ADD instruction to establish a new termination T' and indicates a Handover Package with the above signal of Take over Announcement Channel to the MGW; after receiving the Handover Package and getting the Take over Announcement Channel instruction according to the Signal Description therein, the MGW transfers the announcement channel providing the announcement service from the original termination T to the new termination T' based on the ID of the original termination T, connects the resource channel with the new termination T' after the user accesses a new RNC, and continues with the task of providing the announcement service and realizing the function of continuous announcement during a switch procedure. As a result, the problem of interruption or discontinuity of announcement will be solved.

Figure 4:
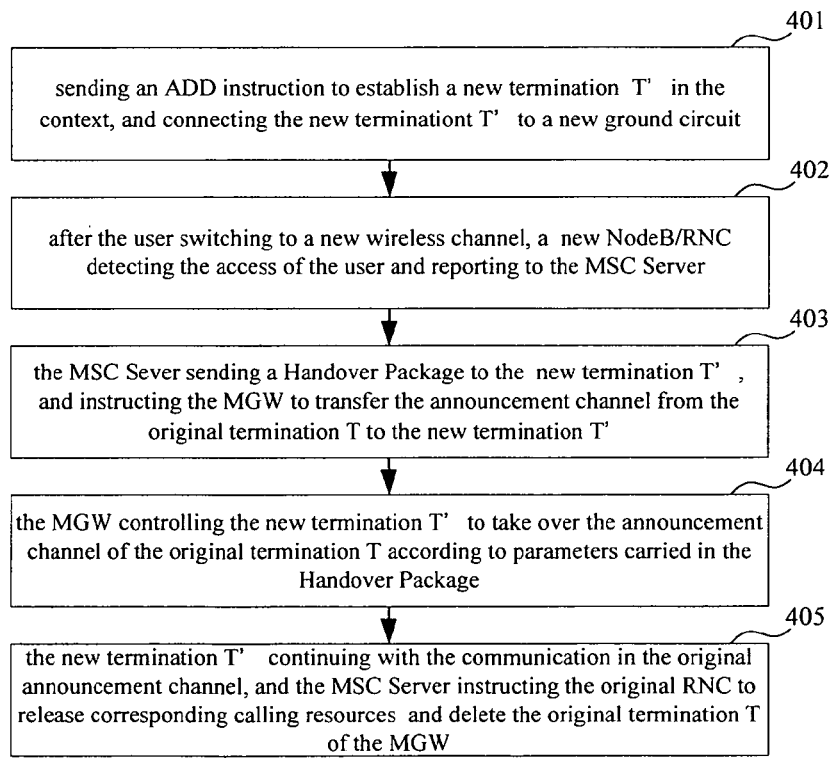
FIG. 4 is the flowchart of taking over an announcement channel during a switch procedure according to a first embodiment.

According to above definition of the Handover Package, FIG. 4 shows the flowchart of the switch method ensuring continuous announcement in accordance with the present embodiment, the method includes:

Step 401: After receiving a switch request, the MSC Server sending an ADD instruction to control the MGW establishing a new termination T' in the context, and connecting the new termination T' to a new ground circuit;

Step 402: After the user switches to a new wireless channel, a new Node B/RNC detecting the access of the user and reporting the access to the MSC Server;

Step 403: The MSC Server indicating a Handover Package with a Take over Announcement Channel signal, and instructing the MGW transferring the announcement channel of the original termination T to the new termination T'.

In this step, after receiving the Handover Package with the Take over Announcement Channel signal, the MGW first checks whether the original termination has an announcement channel, and whether the original termination and the new termination which will take over the announcement channel are in a same context according to the original termination identification parameter carried in the Handover Package. If yes, the MGW controls the original termination T transferring the announcement channel to the new termination T'; otherwise, the MGW returns an error message to the MSC Server.

Step 404: The MGW controlling the new termination T' taking over the announcement channel from the original termination T according to the parameters carried in the Take over Announcement Channel signal in the Handover Package.

During the above procedure, if the MSC Server has once sent an event request to the original termination, for example, an announcement ending notice, the MSC Server will resend this event request to the new termination T' so as to ensure the integrity of signaling communication and avoid resource loss.

Step 405: After the switch is completed, the new termination T' continuing the communication in the announcement channel of the original termination T, and the MSC Server instructing the original RNC releasing corresponding resources and deleting the original termination T of the MGW.

Figure 5:
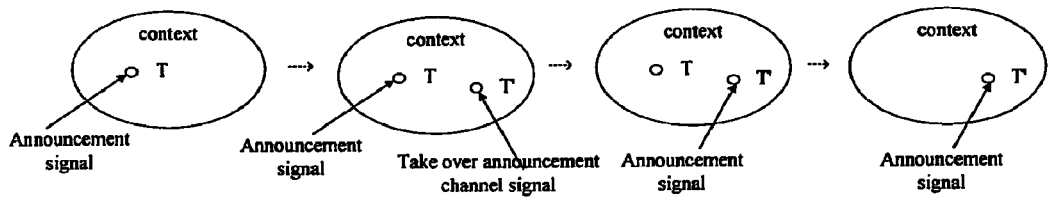
FIG. 5 is a schematic diagram illustrating changes of connection between terminations in a context during the procedure of taking over an announcement channel according to the first embodiment.

FIG. 5 is a schematic diagram illustrating changes of connection between terminations in the context during the process of taking over an announcement channel in the first embodiment.

As shown in FIG. 5, when voice is reproduced for a mobile user by the system via the original termination T, if a switch of the mobile user occurs, the MSC Server, after receiving a switch request, sends an ADD instruction to control the MGW establishing a new termination T' in the context, which connects to a new ground circuit. After the user switches to a new wireless channel, a new Node B/RNC will detect the access of the user, and after receiving a report from the side of the radio access network. If an announcement is being played at the original termination T, the MSC Server indicates a Handover Package with a threegho/tkann signal, i.e. a Take over Announcement Channel signal, to the MGW, requesting the MGW to transfer the announcement channel from the original termination T to the new termination T'. After the announcement channel is inherited, the new termination T' can continue playing the announcement to the user. During the above process, if the MSC Server has once sent an event request to the original termination, for example, an announcement ending notice, the MSC Server should resend this event request to the new termination T' at the same time when it indicates the Handover Package; and after the switch is completed, the MSC Server instructs the original RNC to release the corresponding calling resources and delete the original termination T of the MGW.

It can be seen from the above embodiment that, by indicating a Handover Package with a Take over Announcement Channel signal, the new termination in the context is enabled to inherit an announcement Channel from the original termination during a switch procedure, and the continuity of an announcement service can be ensured during a switch procedure.

A Second Embodiment

This embodiment carries out an IWF channel inheriting controlled by the MSC server via an expanded H.248 message, i.e. a user-defined Handover Package so as to ensure the continuity of a data service during a switch procedure.

In this embodiment, when the MSC Server receives a switch request from a RNC/BSC at the side of a radio access network, it will immediately add a new termination T' in the context of the MGW through an ADD instruction, and connect the new termination T' to a new ground circuit to access a new RNC for communication after the switch procedure. At the same time, the MSC server needs to indicate a Handover Package, and the Handover Package carries needed parameters for a switch procedure; after receiving the Handover Package, the new termination T' can inherit an IWF channel from the original termination according to the parameters carried in the Handover Package and the continuity of a data service is maintained.

The Handover Package of this embodiment is basically the same as the Handover Package of the first embodiment. However the Signal field of the Handover Package in the second embodiment is defined as Take over Inter-working Function, and the parameters carried by the Signal field include specifically:

Signal Identification for identifying the signal, which is defined as tkiwf (0x0002), i.e. an abbreviation of Take over Inter-working Function; Signal Description, for instructing the new termination T' to take a corresponding action, which is defined as "Capture an IWF entity of a designated termination"; Signal Type, which is defined as Brief; and Duration, which is defined as NO.

In addition, the parameters carried by the Signal field may also include the following additional parameters: Original Termination ID, used to facilitate the new termination to find the owner of the resource channel it wants to inherit, i.e. identification of the original termination T; Parameter ID, used to indicate the character of the additional parameters, defined as oriterm (0x000); Type, used to indicate the data type of the additional parameters, which is defined as Integer; Possible values, which is defined as any legal Termination ID except Root and Wildcard; and Parameter Description, indicating which termination's inter-working function is to be taken over.

Similarly, the above Original Termination ID can also be denoted in a text code. Under such circumstances, the Type should be defined as Character String.

It can be seen that the above Take over Inter-working Function signal defines the needed parameters when the new termination T' takes over an IWF channel from the original termination T, such as the ID and action description of the original termination T.

During data service communications, for example, during communications between a mobile user and a fixed network user, when a switch procedure occurs, the MSC Server, after receiving a switch request from the RNC side, sends an ADD instruction to establish a new termination T' and indicates a Handover Package with the above Take over Inter-working Function signal to the MGW; after receiving the Handover Package and getting the Take over Inter-working Function instruction according to Signal Description therein, the MGW transfers the IWF channel which is performing data service communications from the original termination T to the new termination T' according to the ID of the original termination T; and after the user accesses the new RNC, the MGW connects the IWF channel with the new termination T' so as to continue the data service communications, realizing the function of continuous communications during a switch procedure. Therefore the problem of interruption and discontinuity of data service communications is solved.

Figure 6:
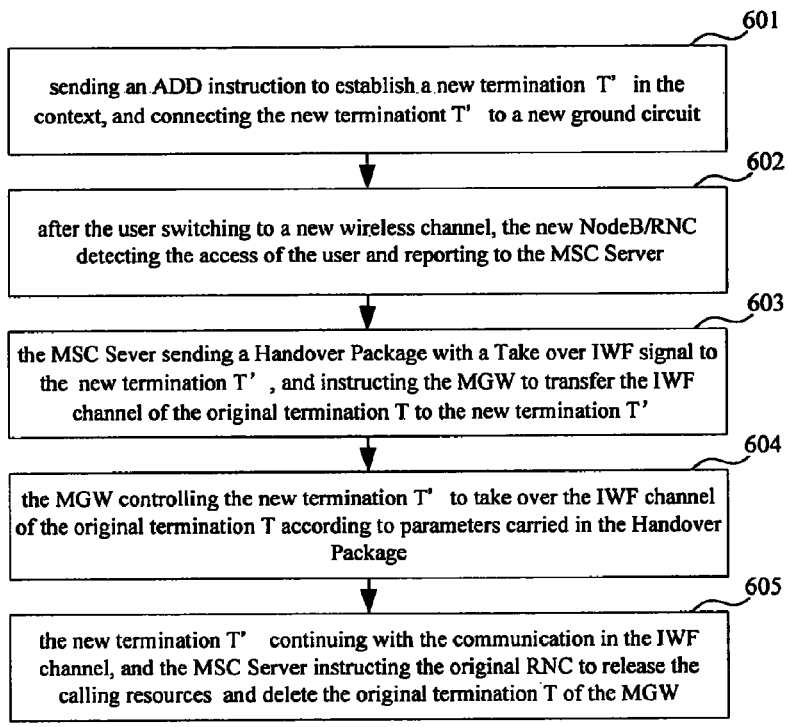
FIG. 6 is the flowchart of taking over an IWF channel during a switch procedure according to a second embodiment.

According to the above definition of the Handover Package, FIG. 6 shows a flowchart of the switch method for data service communications in accordance with the second embodiment, the method includes:

Step 601: After receiving a switch request, the MSC Server sending an ADD instruction to control the MGW establishing a new termination T' in the context, and connecting the new termination T' to a new ground circuit;

Step 602: After the user switches to a new wireless channel, a new Node B/RNC detecting the access of the user and reporting the access to the MSC Server;

Step 603: The MSC Server indicating a Handover Package with a Take over Inter-working Function signal at T', and instructing the MGW to transfer the IWF channel from the original termination T to the new termination T'.

In this step, after receiving the Handover Package with a Take over Inter-working Function signal, the MGW should check first, according to the original termination identification parameter carried by the Handover Package, whether the original termination has an IWF channel and whether the original termination and the new termination to take over the IWF channel are in the same context, if yes, the MGW controls the original termination T transferring the IWF channel to the new termination T'; otherwise, the MGW should return an error message to the MSC Server.

Step 604: The MGW controlling the new termination T' taking over and inheriting the IWF channel of the original termination T according to the parameters, e.g. the original termination identification, carried by the Take over Inter-working Function signal in the Handover Package.

During the above process, if the MSC Server has once sent an event request to the original termination, (for example, a rate change notice), the MSC Server should resend the event request to the new termination T' so as to ensure the integrity of signaling communication and avoid losses of resource.

Step 605: After the switch is completed, the new termination T' continuing the communications via the IWF channel of the original termination T, and the MSC Server instructing the original RNC to release the corresponding calling resources and delete the original termination T of the MGW.

Figure 7:
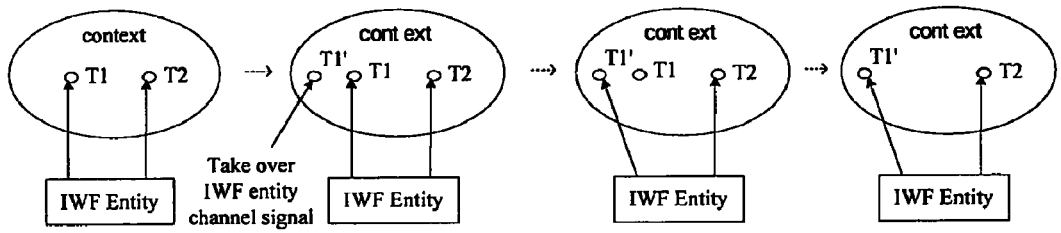
FIG. 7 is a schematic diagram illustrating changes of connection between terminations and an IWF entity in a context during the procedure of taking over an IWF channel according to the second embodiment.

FIG. 7 is a schematic diagram illustrating changes of connection between Terminations in the context and IWF during the procedure of taking over an IWF channel in the second embodiment.

As shown in FIG. 7, when a mobile user is carrying out data service communications, Termination T1 in a context of the MGW is connected to Termination T2 corresponding to the opposite user or network through an IWF entity; when a switch occurs to this mobile user, after receiving a switch request, the MSC Server sends an ADD instruction to control the MGW establishing a new termination T1' in the context, which connects to a new ground circuit; after the user switches to a new wireless channel, a new Node B/RNC will detect the access of the user, and after receiving a report from the radio access network. If the original termination T1 has an IWF entity, the MSC Server indicates a Handover Package with threegho/tkiwf signal, i.e. Take over Inter-working Function signal to the MGW, requesting the MGW to transfer the IWF channel of the original termination T1 to the new termination T1'; After the IWF channel is inherited, the new termination T1' can continue with the data service communications. During the above process, if the MSC Server has once sent an event request to the original termination T1, for example, a velocity change notice, the MSC Server should resend the event request to the new termination T1' at the same time as it indicates the Handover Package; After finishing the switch procedure, the MSC Server instructs the original RNC to release the corresponding calling resources and delete the original termination T1 of the MGW.

It can be seen from above embodiment that, by indicating a Handover Package with a Take over Inter-working Function signal, the new termination in the context is enabled to inherit the IWF channel from the original termination during a switch procedure, and the continuity of data communications is ensured during the switch procedure.

A Third Embodiment

This embodiment carries out an IWF channel inheriting controlled by the MSC server via an expanded H.248 message, i.e. a user-defined Handover Package so as to ensure the continuity of a QNC service during a switch procedure.

The Handover Package of this embodiment includes basically the same contents as the Handover Package of the second embodiment and a switch method of this embodiment is the same as the switch method in the steps 601-605 in the second embodiment. So there is no need to repeat it here. However in the MGW, there is no termination T2 corresponding to the data network in the third embodiment.

Figure 8:
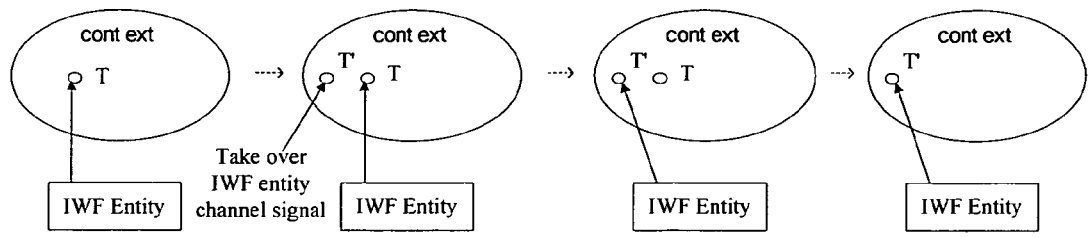
FIG. 8 is a schematic diagram illustrating changes of connection between terminations and an IWF entity in a context during the procedure of taking over an IWF channel according to a third embodiment.

FIG. 8 is a schematic diagram illustrating the changes of connection between the terminations in the context and the IWF entity during the process of taking over an IWF channel in accordance with the third embodiment.

As shown in FIG. 8, when a mobile user is carrying out communications for a QNC service, Termination T in a context of the MGW is connected to a data network through an IWF entity. When a switch occurs to the mobile user, after receiving a switch request, the MSC Server sends an ADD instruction to control the MGW establishing a new termination T' in the context, which is connected with a new ground circuit. After the user has switched to a new wireless channel, a new Node B/RNC will detect the access of the user, and after receiving a report from the radio access network, if there is an IWF entity connected with the original termination T, the MSC Server indicates a Handover Package with a threegho/tkiwf signal, i.e. a Take over Inter-working Function signal to the MGW, requesting the MGW to transfer the IWF channel of the original termination T to the new termination T'. After the IWF channel is inherited, the new termination T' can maintain the communications of the QNC service. During the above process, if the MSC Server has once sent an event request to the original termination T, for example, a velocity change notice, the MSC Server should resend this event request to the new termination T' at the same time as it indicates the Handover Package. After finishing the switch process, the MSC Server instructs the original RNC to release the corresponding calling resources and delete the original termination T of the MGW.

As shown in the third embodiment, by indicating a Handover Package with a Take over Inter-working Function signal, the new termination in the context is enabled to inherit the IWF channel from the original termination during a switch procedure, and the continuity of a QNC service can be ensured during the switch procedure.

It can be understood by persons skilled in the art that the specific format, parameter definition and values of the Handover Package in the first embodiment to the third embodiment can be configured according to practical situations to carry the needed parameters for inheriting a resource channel conveniently and reasonably, wherein the signal format and the carried parameters can also be expanded according to practical applications to implement the inheritance of more types of resource channels during a switch, which is not limited to the schemes given by the above preferred embodiments.

A Fourth Embodiment

This embodiment carries out an announcement channel inheriting under the control of the MSC Server by configuring a network topology relationship between/among the terminations in the context so as to ensure the continuity of an announcement operation during a switch procedure.

When the system is carrying out an announcement service to a mobile user, a virtual termination T2 is added in the context of the MGW under the control of the MSC Server so as to form a topology relationship between the terminations. When establishing the virtual termination T2, the system assigns only logical resources rather than bearer resources to the termination, i.e. the virtual termination T2 occupies only logical resources rather than bearer resources. For example, in terms of a TDM bearer, a virtual termination does not correspond to a circuit; in terms of a Real-time Transfer Protocol (RTP) bearer, a virtual termination does not correspond to an IP address and a port number. Except these, other characters of a virtual termination are basically the same as those of a normal termination, for example, a virtual termination similarly has a unique Termination ID in the MGW; a virtual termination can receive instructions from the MSC Server, such as ADD, SUBSTRACT, MODIF, AUDIT and so on, and implement such logical operation as appointing topology relationship.

The MGW can adopt more than one method to distinguish a virtual termination from a normal termination, for example, two methods may be adopted as follows:

(1) The MSC Server and the MGW negotiate a Termination ID with special implication, for example, the value of two certain bytes is permanently set as 0x5FFF, and when a termination designated by the MSC Server has the Termination ID matched with the permanently set value, the MGW will think that a virtual termination is being operated. Under such circumstances, the Termination ID of a virtual termination is assigned by the MSC Server.

(2) When operating on a termination, the MSC Server adds a character of "Virtual Termination" to indicate whether the termination is a virtual termination by expanding the basic package of H.248 protocol. After receiving an instruction, the MGW decides whether to deal with this termination as a virtual termination by recognizing this character parameter. Under such circumstances, the Termination ID of a virtual termination is assigned by the MGW.

Figure 9:
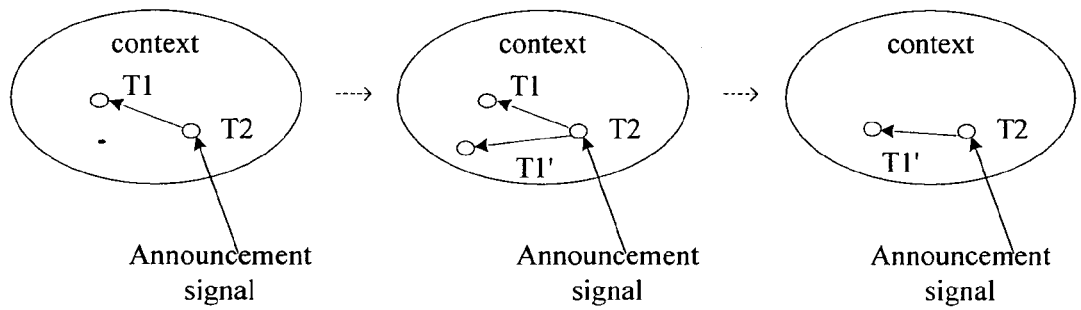
FIG. 9 is a schematic diagram illustrating changes of connection between terminations in a context during the procedure of taking over an announcement channel according to a fourth embodiment.

FIG. 9 is a schematic diagram illustrating the changes of connection between terminations in the context during the process of taking over an announcement channel in the fourth embodiment.

As shown in FIG. 9, under normal conditions, the system implements announcement to an original termination T1 by making announcement to a virtual termination T2, i.e. under normal conditions, when the system needs to make announcement to an original termination T1, it does not send an announcement signal directly to T1, but sends the announcement signal through a virtual termination T2; that is, first, the system makes announcement to the virtual termination T2, then the virtual termination T2 makes announcement to the original termination T1. In order to realize announcement service from the virtual termination T2 to the original termination T1, the network topology relationship between the virtual termination T2 and the original termination T1 needs to be designated as a unidirectional topology relationship pointing to the original termination T1 from the virtual termination T2. In this way, when the system sends an announcement signal to termination T2, the announcement service provided by the system to the mobile user can be carried out through the topology structure from termination T2 to termination T1.

When a switch of mobile user occurs, the system establishes a new termination T1', and the new termination T1' corresponds to a new ground circuit. At this moment, the system designates the network topology relationship between the termination T1' and the termination T2 as a unidirectional topology relationship pointing to the termination T1' from the termination T2; thus T2 will make announcement to T1 and T1' at the same time. As a result, no matter the mobile user accesses from T1 or T1' before or after a switch procedure, the effect of the announcement service will not be influenced, and the continuity of the announcement can be ensured.

During the above process, if the MSC Server has sent an event request to the virtual termination T2, for example, an announcement ending notice, the MSC Server need not to resend this event request as the virtual termination T2 remains unchanged in the switch procedure.

After the switch of the mobile user, Termination T1 can be deleted.

After the announcement is completed, Termination T2 may be deleted so as to further avoid wasting resource.

As shown in the fourth embodiment, by appointing a topology relationship of the original termination and the new termination with the virtual termination, the new termination in the context is enabled to inherit the announcement channel from the original termination during a switch procedure, and the continuity of announcement operation can be ensured during the switch procedure.

A Fifth Embodiment

This embodiment carries out an IWF channel inheriting under the control of the MSC Server via identifying changes of network topology relationship between/among terminations in the context to ensure the continuity of a data service during a switch procedure.

Figure 10:
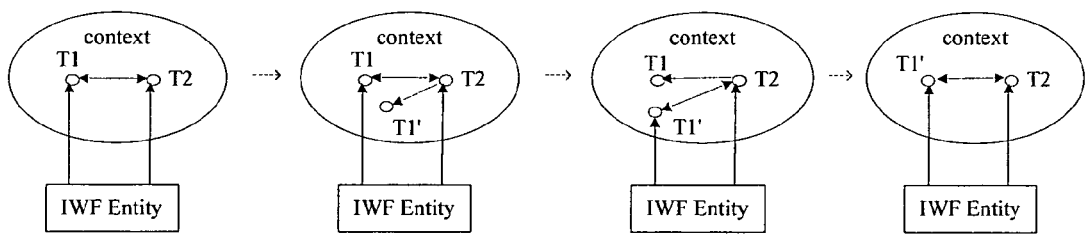
FIG. 10 is a schematic diagram illustrating changes of connection between terminations and an IWF entity in a context during the procedure of taking-over an IWF channel according to a fifth embodiment.

FIG. 10 is a schematic diagram illustrating changes of network topology between terminations in a context and an IWF entity during the process of taking over an IWF channel in the fifth embodiment.

As shown in FIG. 10, under normal conditions, Termination T1 of the mobile side in the context has been connected with Termination T2 corresponding to the opposite user or network through an IWF entity, and the relationship between the two terminations is appointed as a normal topology relationship, i.e. the relationship between Termination T1 and Termination T2 is a bidirectional topology relationship.

When a switch of the mobile user occurs, the system establishes a new termination T1', and the new termination T1' corresponds to a new ground circuit. At this moment, the system designates the network topology relationship between Termination T1' and Termination T2 as a switch topology relationship, i.e. a unidirectional topology relationship pointing to Termination T1' from Termination T2.

During the above process, if the MSC Server has once sent an event request to the original Termination T1, for example, a rate change notice, the MSC Server should resend this event request to the new Termination T1' so as to ensure the integrity of signaling communication and avoid resource loss.

After detecting that the mobile user has switched to a new wireless channel, the MSC Server modifies the network topology relationship between Termination T1 and Termination T2 to a switch topology relationship, i.e. a unidirectional topology relationship pointing to Termination T1 from Termination T2, and modifies the network topology relationship between Termination T2 and Termination T1' to a normal topology relationship, i.e. a bidirectional topology relationship. At this moment, the MGW can determine that the current mobile user has been handed over according to the change of the topology relationships of the original termination T1 and new termination T1' with Termination T2 corresponding to the opposite user or network, and then the IWF channel will be transferred from the original termination T1 to the new termination T1'.

After the switch procedure, the Termination T1' inherits the IWF channel from the original termination T1 and continues with the data service communications, and then the system may delete the original termination T1.

As shown in the fifth embodiment, by designating the topology relationships of the original termination and the new termination with the termination corresponding to the opposite user or network, the MGW can control the new termination inheriting the IWF channel from the original termination by means of detecting the change of the topology relationships between the terminations during a switch process. The continuity of a data service can therefore be ensured during the switch procedure.

A Sixth Embodiment

This embodiment carries out an IWF channel inheriting under the control of the MSC Server by means of recognizing changes of the network topology relationships between/among terminations in the context to ensure the continuity of a QNC service during a switch procedure.

Since a QNC service is directly connected to a data network or a packet network through an IWF entity, there is no termination in the context corresponding to an opposite user or network, and there is no network topology relationship between the terminations. To solve this problem, as with the method in the fourth embodiment, the MSC Server first establishes a virtual termination T2 in the context of the MGW so as to construct a topology relationship between the terminations. Similarly, the virtual termination T2 occupies only logical resources rather than bearer resources.

Figure 11:
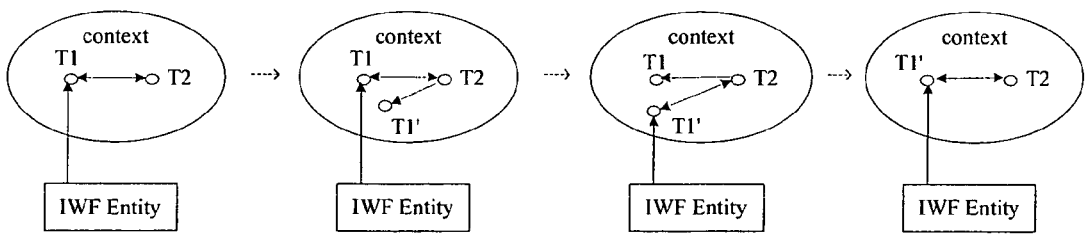
FIG. 11 is a schematic diagram illustrating changes of connection between terminations and an IWF entity in a context during the procedure of taking over an IWF channel according to a sixth embodiment.

FIG. 11 is a schematic diagram illustrating the changes of the network topology relationships between terminations in the context and an IWF entity during the process of taking over an IWF channel in the sixth embodiment.

As shown in FIG. 11, under normal conditions, Termination T1 of the mobile side in the context has been connected with Termination T2 corresponding to the opposite user or network through an IWF entity, and the relationship between the two terminations is appointed as a normal topology relationship, i.e. a bidirectional topology relationship.

When a switch of the mobile user occurs, the system establishes a new termination T1', and the new termination T1' corresponds to a new ground circuit. At this moment, the system designates the network topology relationship between Termination T1' and Termination T2 as a unidirectional topology relationship pointing to Termination T1' from Termination T2.

Similarly, during the above process, if the MSC Server has once sent an event request to the original termination T1, for example, a rate change notice, the MSC Server will resend this event request to the new termination T1' to ensure the integrity of signaling communication and avoid resource loss.

After detecting that the mobile user has switched to a new wireless channel, the MSC Server modifies the network topology relationship between Termination T1 and Termination T2 to a switch topology relationship, i.e. a unidirectional topology relationship pointing to Termination T1 from Termination T2, and modifies the network topology relationship between termination T2 and termination T1' to a normal topology relationship, i.e. a bidirectional topology relationship. At this moment, the MGW can determine that the current mobile user has been handed over according to the change of the topology relationships of the original termination T1 and the new termination T1' with Termination T2 corresponding to the opposite user or network, and then the IWF channel will be transferred from the original termination T1 to the new termination T1'.

After the switch procedure, the new Termination T1' inherits the IWF channel from the original termination T1 and continues with the data service communication, and then the system can delete the original termination T1.

Since the virtual termination T2 is only used to establish a topology relationship with termination T1 or termination T1' and has no real function of a communication termination, the appointment of the topology relationship thereof becomes more free. Traditionally, as Termination T2 represents the opposite end of the service, a normal topology relationship appointed is usually a bidirectional relationship and a switch topology relationship appointed is a point-in unidirectional relationship. In this way, for bidirectional services such as a voice service, at the moment of a switch, it is ensured that the voice of the opposite end flow to T1' and the user hear the voice from the opposite side immediately. In the present embodiment, however, since the purpose of the virtual termination T2 is informing the MGW that a switch of the mobile user has occurred, other methods of appointment may be also used as long as the two topology relationships (a normal topology relationship and a switch topology relationship) before and after the switch procedure can be distinguished. Therefore, the method of appointing topology relationship in this embodiment can be replaced by other solutions. For example, in terms of a virtual termination T2, the switch topology relationship or normal topology relationship can be appointed as a point-in unidirectional topology relationship, a point-out unidirectional topology relationship or a bidirectional topology relationship; the object of the invention can be attained as long as the switch topology relationship is different from the normal topology relationship appointed.

As shown in the sixth embodiment, by appointing topology relationships of the original termination and the new termination with the opposite termination or network, the MGW can control the new termination inheriting the IWF channel from the original termination by means of detecting the changes of the topology relationship between the terminations during a switch procedure. Thus, the continuity of a QNC service can be ensured during the switch procedure.

The above description is only preferred embodiments of the present invention, but not intended to confine the scope of the present invention which is defined by the appended claims.

The invention claimed is:

1. A switch method for ensuring communication continuity, comprising:
   when a switch occurs to a Mobile Station (MS), a Mobile Switching Center (MSC) Server controlling a Media Gateway (MGW) establishing in a context a new termination connecting to a new ground circuit
   before the switch of the MS, the MSC Server setting a network topology relationship between an original termination and a termination corresponding to the opposite user or network as a normal network topology relationship;
   after the establishment of the new termination, the MSC Server setting the network topology relationship between the new termination and the opposite termination as a switch network topology relationship;
   after the MS switching to a new wireless channel, the MGW controlling the new termination inheriting a resource channel of the original termination connecting to an original ground circuit, and continuing with the communications through the resource channel
   before the MGW controlling the new termination inheriting the resource channel from the original termination, the MSC Server instructing the MGW to transfer the resource channel from the original termination to the new termination, wherein the step of instructing comprises: the MSC Server modifying the network topology relationship between the original termination and the opposite termination to a switch network topology relationship, and modifying the network topology relationship between the new termination and the opposite termination to a normal network topology relationship; and
   the step of controlling the new termination inheriting the resource channel comprises: the MGW controlling the new termination inheriting the resource channel of the original termination according to the changes of the network topology between the opposite termination and the original termination and between the opposite termination and the new termination.

2. The switch method for ensuring communication continuity according to claim 1, wherein
   the switch topology relationship is a unidirectional topology relationship with the opposite termination pointing to the original termination or the new termination; and
   the normal topology relationship is a bidirectional topology relationship between the opposite termination and the original termination or the new termination.

3. A switch method for ensuring communication continuity comprising:
   when a switch occurs to a Mobile Station (MS), a Mobile Switching Center (MSC) Server controlling a Media Gateway (MGW) establishing in a context a new termination connecting to a new ground circuit; and
   after the MS switching to a new wireless channel, the MGW controlling the new termination inheriting a resource channel of an original termination connecting to an original ground circuit, and continuing with the communications through the resource channel;
   before the MGW controlling the new termination inheriting the resource channel from the original termination, the MSC Server instructing the MGW to transfer the resource channel from the original termination to the new termination, wherein the step of instructing comprises the MSC Server indicating a Handover Package to the MGW; and the step of controlling the new termination inheriting the resource channel comprises: the MGW controlling the new termination inheriting the resource channel from the original termination according to the information carried by the Handover Package, wherein the information carried by the Handover Package comprises at least one of the following fields: Package Identification, Version, Extends, Properties, Events, Signals and Statistics; wherein the Signals field comprises a Signal Identification, a Signal Description and an Original Termination Identification, and the resource channel is an announcement channel used to play announcement for the MS, the Signal Identification carried in the Handover Package is Take over Announcement Channel; and the Signal Description carried in the Handover Package is Capture the announcement channel of the termination identified by the Original Termination Identification;
   after the MGW receiving the Handover Package with a Take over Announcement Channel signal, the MGW checking, according to the Original Termination Identification parameter carried by the Handover Package, whether the original termination indicated by the Original Termination Identification has an announcement channel and whether the original termination and the new termination are in the same context, if yes, the MGW controlling the new termination inheriting the announcement channel from the original termination; otherwise, the MGW returning an error message to the MSC Server.

4. A switch method for ensuring communication continuity comprising, when a switch occurs to a Mobile Station (MS), a Mobile Switching Center (MSC) Server controlling a Media Gateway (MGW) establishing in a context a new termination connecting to a new ground circuit; and after the MS switching to a new wireless channel, the MGW controlling the new termination inheriting a resource channel of an original termination connecting to an original ground circuit, and continuing with the communications through the resource channel;

before the MGW controlling the new termination inheriting a resource channel from an original termination, the MSC Server instructing the MGW to transfer the resource channel from the original termination to the new termination, wherein the step of instructing comprises the MSC Server indicating a Handover Package to the MGW; and the step of controlling the new termination inheriting the resource channel comprises: the MGW controlling the new termination inheriting the resource channel from the original termination according to the information carried by the Handover Package, wherein the information carried b the Handover Package comprises at least one of the following fields: Package Identification Version Extends Properties, Events, Signals and Statistics; wherein the Signals field comprises a Signal Identification, a Signal Description and an Original Termination Identification, and the resource channel is an Inter-Working Function (IWF) entity channel for use in communications of data service or Quick Network Connection (QNC) service; the Signal Identification carried by the Handover Package is Take over Inter-working Function; and the Signal Description carried by the Handover Package is Capture the IWF channel of the termination identified by the Original Termination Identification.

5. The switch method for ensuring communication continuity according to claim 4 further comprising:

after the MGW receives the Handover Package with a Take over Inter-working Function signal, the MGW checking, according to the Original Termination Identification parameter carried by the Handover Package, whether the original termination indicated by the Original Termination Identification has an IWF entity, and whether the original termination and the new termination are in the same context, if yes, the MGW controlling the new termination inheriting the IWF entity of the original termination; otherwise, the MGW returning an error message to the MSC Server.

6. A switch method for ensuring communication continuity, comprising:

when a switch occurs to a Mobile Station (MS), a Mobile Switching Center (MSC) Server controlling a Media Gateway (MGW) establishing in a context a new termination connecting to a new ground circuit; and after the MS switching to a new wireless channel, the MGW controlling the new termination inheriting a resource channel of an original termination connecting to an original ground circuit, and continuing with the communications through the resource channel;

in terms of an announcement service, before the switch of the MS, the MSC Server establishing a virtual termination and setting the topology relationship between the virtual termination and the original termination as a unidirectional topology relationship with the virtual termination pointing to the original termination, and the virtual termination playing the announcement to the MS via the original termination;

after the establishment of the new termination, the MSC Server setting the topology relationship between the virtual termination and the new termination as a unidirectional topology relationship with the virtual termination pointing to the new termination, and the virtual termination playing the announcement to the mobile user via the original termination and the new termination at the same time; and the step of inheriting comprises: the virtual termination playing announcement to the mobile user via the new termination.

* * * * *

UNITED STATES PATENT AND TRADEMARK OFFICE
CERTIFICATE OF CORRECTION

| | | |
|---|---|---|
| PATENT NO. | : 7,885,655 B2 | |
| APPLICATION NO. | : 11/542967 | |
| DATED | : February 8, 2011 | |
| INVENTOR(S) | : Fang Yin | |

It is certified that error appears in the above-identified patent and that said Letters Patent is hereby corrected as shown below:

Column 17, line 31, "b" should read --by--.

Column 17, line 33, "Version Extends" should read --Version, Extends,--.

Signed and Sealed this

Twenty-ninth Day of March, 2011

David J. Kappos
*Director of the United States Patent and Trademark Office*